United States Patent [19]

Legueu

[11] 4,128,270
[45] Dec. 5, 1978

[54] VEHICLE FLOORING CONSTRUCTION

[76] Inventor: Paul E. R. Legueu, 85, avenue de Mazy, 44380, Pornichet, France

[21] Appl. No.: 737,503

[22] Filed: Nov. 2, 1976

Related U.S. Application Data

[63] Continuation of Ser. No. 529,509, Dec. 4, 1974, abandoned.

[51] Int. Cl.² .............................................. B60P 3/22
[52] U.S. Cl. .................... 296/28 R; 280/5 A
[58] Field of Search ............. 280/5 A, 5 R, 5 F, 5 H; 296/1 R, 1 C, 37 R, 28 R; 220/18, 20, 11 B, 1 V, DIG. 5

[56] References Cited

U.S. PATENT DOCUMENTS

| | | | |
|---|---|---|---|
| 1,411,378 | 4/1922 | Robinson | 280/5 A |
| 2,018,870 | 10/1935 | Paton | 296/1 R |
| 2,026,687 | 1/1936 | Lawrenson | 280/5 F |
| 2,090,059 | 8/1937 | McClane | 280/5 H |
| 2,314,298 | 3/1943 | Welch | 280/5 H |
| 2,357,148 | 8/1944 | Turner | 220/18 |
| 2,395,039 | 2/1946 | Crosby | 280/5 F |
| 2,758,845 | 8/1956 | Doyle | 280/5 A |
| 2,902,240 | 9/1959 | La Belle | 280/5 H |
| 3,227,410 | 1/1966 | McCuen | 280/5 H |
| 3,287,058 | 11/1966 | Wells | 296/37 R |
| 3,697,093 | 10/1972 | Cadiou | 280/5 A |

FOREIGN PATENT DOCUMENTS

| | | | |
|---|---|---|---|
| 23852 of | 1930 | Australia | 280/5 A |
| 1420533 | 11/1965 | France | 280/5 A |
| 954445 | 4/1964 | United Kingdom | 280/5 F |

Primary Examiner—Philip Goodman
Attorney, Agent, or Firm—Weiser, Stapler & Spivak

[57] ABSTRACT

The flooring of a vehicle is formed of two rails between which is suspended a water reservoir extending almost the entire length of the vehicle floor, and at least one fuel tank is suspended under the vehicle floor on the far side of the rails.

9 Claims, 5 Drawing Figures

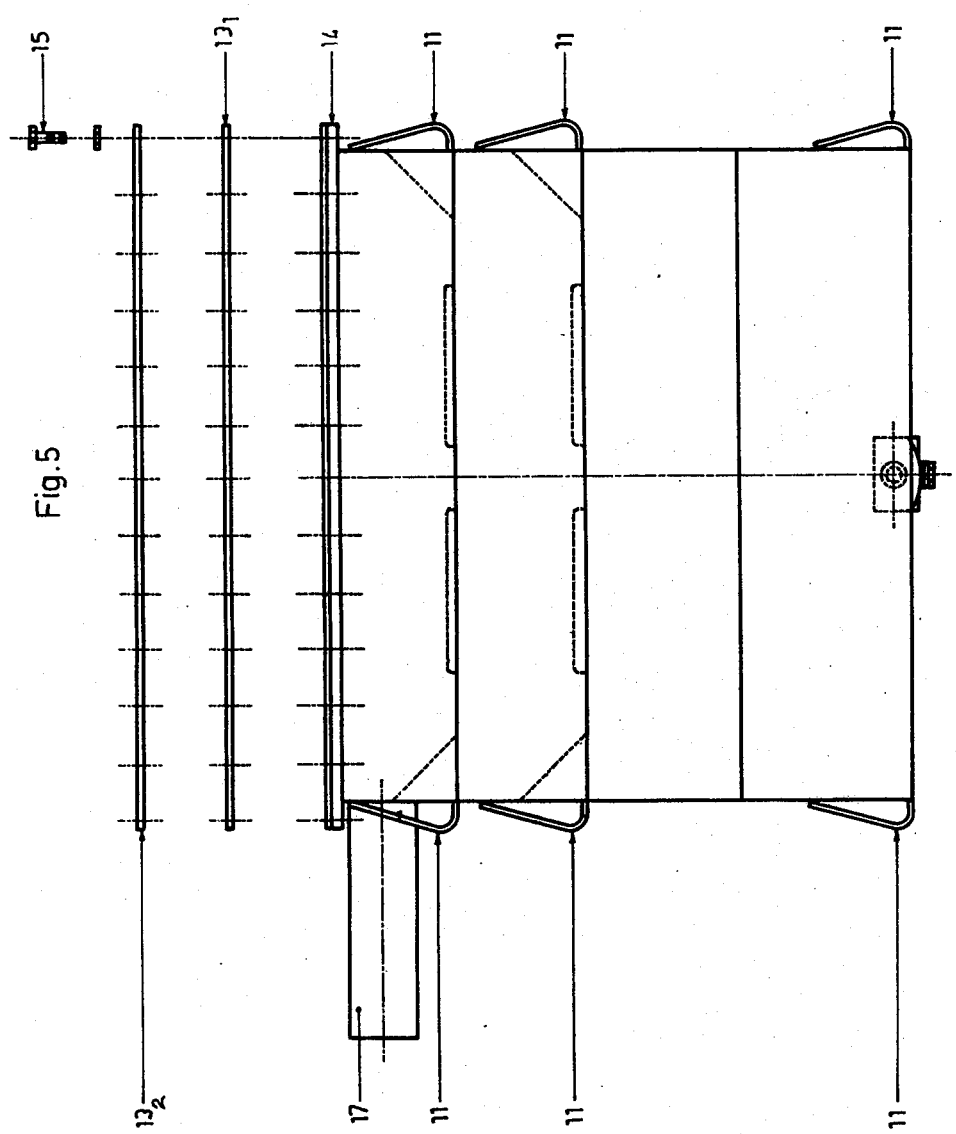

VEHICLE FLOORING CONSTRUCTION

This is a continuation of application Ser. No. 529,509 filed Dec. 4, 1974, now abandoned.

BACKGROUND OF THE INVENTION

This invention relates to a floor construction for an automotive vehicle having wide operating range in terms of both water and fuel supply and useful particularly for vast deserts.

The difficulties of replenishing the water and fuel supplies of vehicles in desert countries and other undeveloped areas require the provision of large reserves which are generally provided by means of portable gerry cans placed either inside or outside of the vehicle. In addition to the weight of these gerry cans, their presence considerably reduces the carrying capacity of the vehicle to the detriment of other products or merchandise which consequently may end up being in short supply. Moreover, these gerry cans must be secured (to avoid having them bump against each other or fall over) and this leads to a needless waste of time.

SUMMARY OF THE INVENTION

It is accordingly an object of the present invention to provide water and fuel storage facilities in a vehicle which are free from the foregoing disadvantages.

This object, and others which will appear, are achieved in accordance with the invention by making provisions within the floor structure of the vehicle itself, for the storage of a substantial quantity of water and fuel. In this manner, the need of resorting to gerry cans for other similar storage means is eliminated. The floor construction embodying the invention comprises two longitudinal rails between which is mounted a water reservoir extending substantially the entire length of the floor. In addition, at least one fuel reservoir is suspended by straps under the floor on either side of the longitudinal rails. In accordance with a preferred embodiment, the water reservoir is mounted between the floor rails by straps terminating at jug handles distributed along the perimeter of the reservoir and neoprene bumpers are inserted between these straps and the reservoir.

For further details, reference may be had to the description which follows in the light of the accompanying drawings, wherein:

BRIEF DESCRIPTION OF THE DRAWINGS

FIG. 5 is an enlarged elevational view of the structure of FIG. 4 taken at right angles from the left of FIG. 4 and showing the lid in exploded relation.

DESCRIPTION OF THE PREFERRED EMBODIMENT OF THE INVENTION

As has been noted, a primary object of the invention is to provide a floor construction for automotive vehicles which permits the storage of water and fuel tanks such that the vehicle equipped with this floor construction has a wide operating range and can be utilized in desert country.

Figure 1:
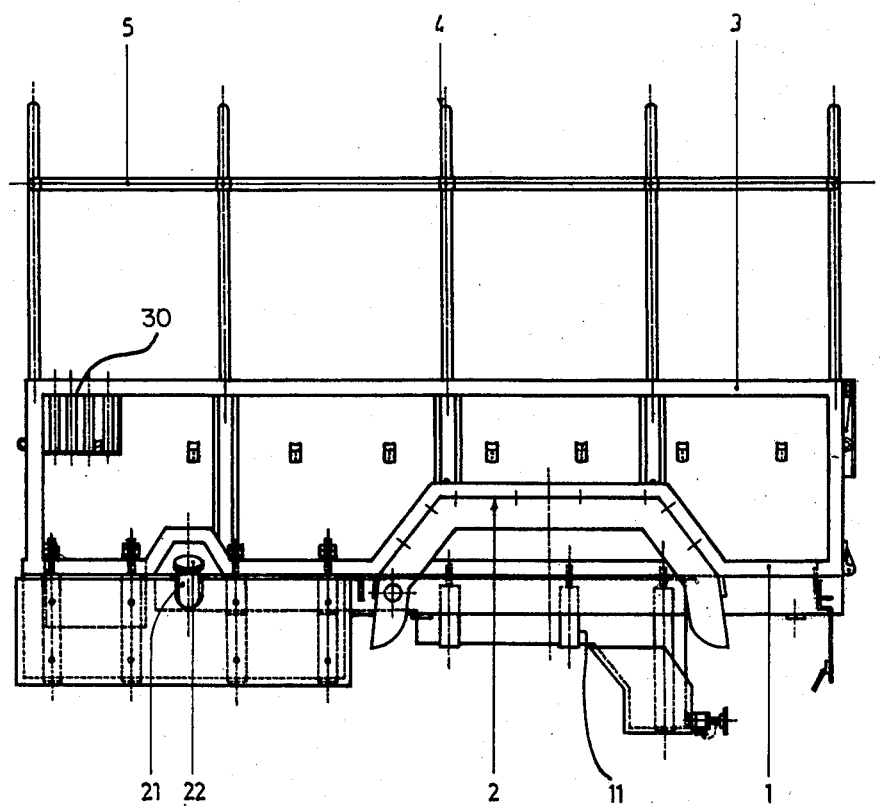
FIG. 1 is a side elevational view of a floor construction of a vehicle embodying the invention and of the body superstructure.
Figure 2:
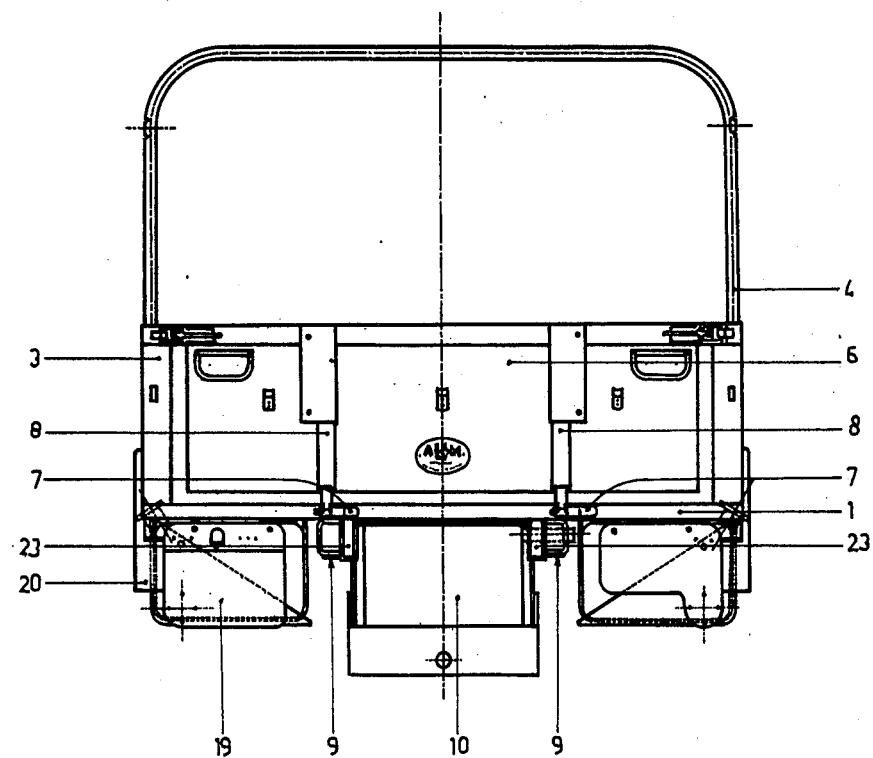
FIG. 2 is a rear elevational view of the embodiment of FIG. 1.
Figure 3:
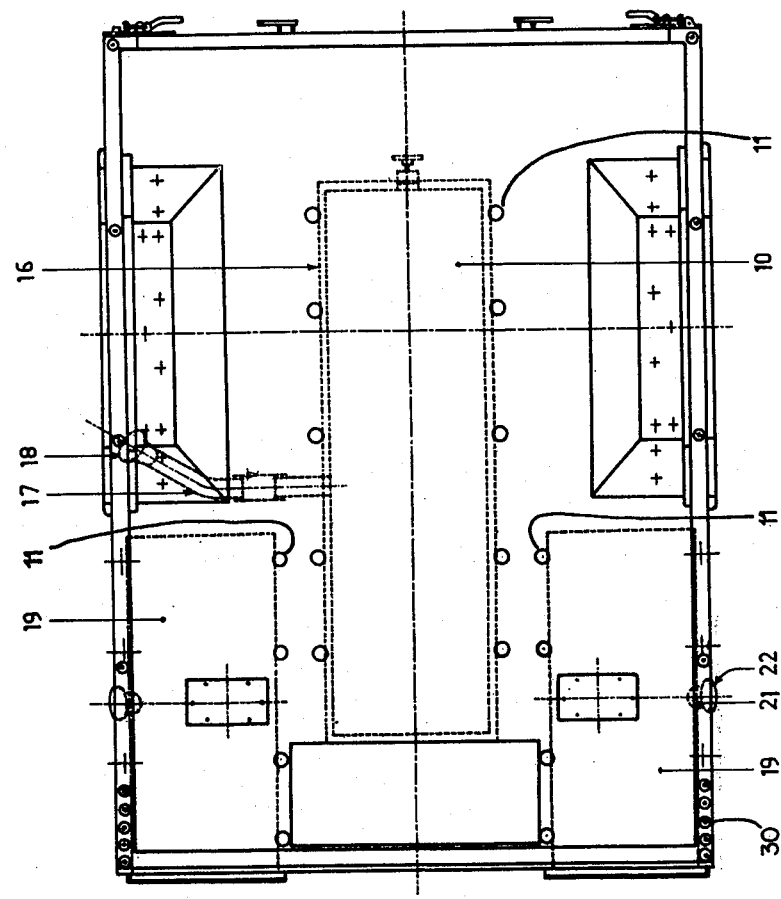
FIG. 3 is a top plan view of the flooring construction, the body superstructure having been omitted for ease of observation of the drawing.
Figure 4:
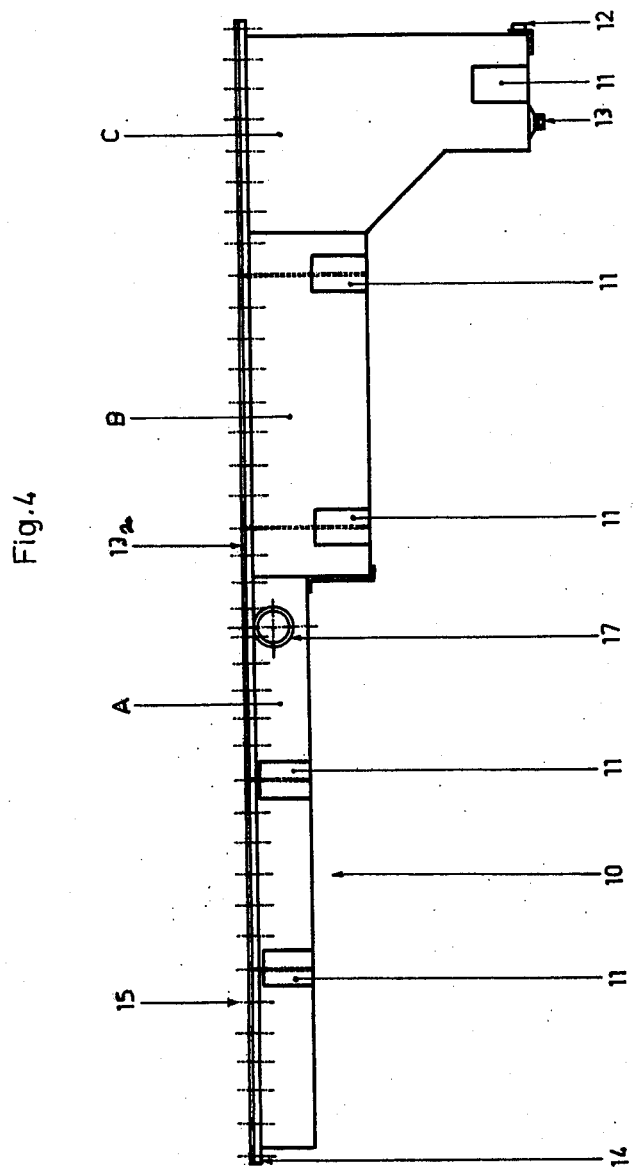
FIG. 4 is a side elevational view of the water reservoir.

To that end the floor construction according to the invention comprises a pair of spaced metal channels 1, which are assembled and shaped to provide wells 2 for accommodating the vehicle wheels. These channels bear fixed posts 3 to which are attached the roof arches 4. The roof arches 4 are joined to each other by a spacer tuber 5. The uprights of arches 4 fit into receptacles 30. The rear end of the vehicle is provided with a tailgate 6 which is tiltable about the right and left pivots 7 and which is given rigidity by the vertical reinforcements 8. The metal channels 1, which constitute the vehicle flooring itself, are provided with two welded rails 9 which are disposed parallel to each other and extend in the horizontal plane of the floor. The space defined between the two rails 9 receives a water reservoir 10 which, as shown in FIG. 3, extends essentially the entire length of the vehicle floor. This tank or reservoir 10 which has a large storage capacity and is suspended below the floor by straps which pass through the jug handles 11. The jug handles 11 are brazed, soldered or otherwise securely fastened to the lengthwise extending sides of the reservoir (see FIG. 5) in order to immobilize the reservoir when in use. To prevent persistent friction between the reservoir 10 and the straps, there are placed between them neoprene bumpers or other resilient pads which counteract rubbing and consequent possible fracture of the straps. The water reservoir 10, as shown in FIG. 4, is stepped and consists of a first portion A of comparatively small height but of extended area in plan, a second portion B of about twice the height of portion A and a third portion C forming the outlet, whose base is provided with a spigot 12 and a drainage plug 13.

The reservoir 10 is provided with a lid $13_2$ which covers its entire surface area. The lid $13_2$ is attached to the rim 14 of the reservoir by screws 15 or other suitable fasteners with a gasket $13_1$ interposed between the rim 14 and the lid $13_2$. The lid $13_2$ is removable and can be demounted to give access to the reservoir for cleaning. The reservoir 10 further includes, on one of its longitudinal sides 16, a filler pipe 17 which is closed by a safety cap 18. It will be understood that this filler pipe is positioned at the highest part of the reservoir as shown in FIG. 4.

On either side of the water reservoir 10 there is suspended a high capacity fuel tank 19, each of which is suspended from the flooring by straps 20 which terminate as was the case for the water reservoir 10, in eyelets or jug handles 11 and with inserted bumpers of neoprene. The two fuel tanks 19 are clearly visible in FIG. 3 and extend in length essentially the entire distance between the front end of the truck body to the wheel well 2. The tanks 19 are filled from the side through filler pipes 21 which are closed by conventional safety caps 22.

The body of the vehicle is laterally immobilized relative to the floor rails 9 by posts 23 which are welded or otherwise secured in place. The displacement between the posts 23 corresponds to the space defined between the two rails 9. Thus, the posts 23 are trapped between the rails 9 which thereby constitute the lateral immobilization shoulders.

This form of flooring construction has the advantage of providing support for all of the tanks including the reservoir and fuel tanks without affecting the capacity of the vehicle as would be the case if portable storage cans were used. In addition, the use of straps to suspend the reservoir and tanks below the vehicle flooring and the use of the neoprene or rubber spacers make it possible to reduce the noise of the tanks and reservoir while the vehicle is moving while insuring proper strapping.

I claim:

1. A floor construction for automotive vehicles having wide operating range, comprising two longitudinal rails affixed below the vehicle floor inboard of the lateral edges of the vehicle floor, a water reservoir mounted between the rails and extending nearly the whole length of the floor, and two fuel tanks, respectively suspended below the floor laterally outwardly of the different rails, the reservoir and each tank being mounted by straps and resilient pads inserted between the straps and the reservoir or tank to prevent noise when the vehicle is in motion.

2. The floor construction of claim 1, wherein the top of said water reservoir is closed by a removable lid, said lid being affixed to the reservoir by at least one fastener.

3. The floor construction of claim 1 characterized in that the water reservoir is of step form, said reservoir having three longitudinally consecutive portions consisting of a first portion of small height and of extended area in plan, a second portion of height greater than the first portion and a third portion of height greater than the second portion.

4. The floor construction of claim 3 wherein the height of the second portion is approximately twice the height of the first portion.

5. The floor construction of claim 4 wherein the third portion is provided with an outlet spigot.

6. The floor construction of claim 1 wherein a pair of spaced posts are welded to the vehicle floor, the displacement between posts equalling the space defined between the rails, the rails trapping the posts therebetween to prevent relative lateral movement therebetween.

7. The floor construction of claim 3 wherein each fuel tank is positioned laterally adjacent to the first portion of the water reservoir.

8. The floor construction of claim 1 wherein the water reservoir is equipped with a plurality of laterally extending jug handles and wherein each said strap passes through a jug handle to secure the water reservoir to the rails.

9. The floor construction of claim 8 wherein the straps terminate in eyelets which are distributed along the perimeter of the reservoir.

* * * * *